(12) United States Patent
Tatewaki et al.

(10) Patent No.: US 6,237,727 B1
(45) Date of Patent: May 29, 2001

(54) WET TYPE MULTI-PLATE FRICTION ENGAGING APPARATUS

(75) Inventors: Hideki Tatewaki; Masaki Sakai, both of Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/384,556

(22) Filed: Aug. 27, 1999

(30) Foreign Application Priority Data

Sep. 1, 1998 (JP) .................................................. 10-247034

(51) Int. Cl.[7] ............................. F16D 69/00; F16D 65/78
(52) U.S. Cl. ................ 188/71.6; 192/70.12; 192/113.34; 188/264 E
(58) Field of Search ............................... 192/70.12, 70.14, 192/85 AA, 113.34, 113.36; 188/71.6, 72.4, 264 E

(56) References Cited

U.S. PATENT DOCUMENTS

| 4,287,978 | * | 9/1981 | Staub, Jr. ......................... 192/113.36 |
| 5,421,439 | * | 6/1995 | Hayasaki ......................... 192/85 AA |
| 5,829,566 | * | 11/1998 | Winks et al. ....................... 192/70.12 |
| 6,062,367 | * | 5/2000 | Hirayangi et al. ........... 192/113.36 X |

FOREIGN PATENT DOCUMENTS 59-54825 * 3/1984 (JP) .................................. 192/113.36

* cited by examiner

Primary Examiner—Richard M. Lorence
(74) Attorney, Agent, or Firm—Vorys, Sater, Seymour and Pease LLP

(57) ABSTRACT

The present invention provides a wet type multi-plate friction engaging apparatus in which axially shiftable outer tooth plates provided on an inner peripheral surface of a drum, and inner tooth plates disposed within the drum and spline-connected to an outer peripheral surface of a hub having lubricating oil supply holes open to the outer surface of the hub are arranged coaxially and alternately, so that the outer tooth plates and the inner tooth plates can be frictionally engaged with each other between a piston disposed at a closed end of the drum and a flange disposed at an open end of the drum by an urging force of the piston, and wherein the drum is not rotated or rotated at a low speed, and friction material are adhered to only the outer tooth plates or the outer tooth plates and the flange.

2 Claims, 3 Drawing Sheets

WET TYPE MULTI-PLATE FRICTION ENGAGING APPARATUS

BACKGROUND OF THE INVENTION

1. Field of the Invention

The present invention relates to a wet type multi-plate friction engaging apparatus, and more particularly, it relates to a wet type multi-plate friction engaging apparatus mainly used as a brake of a transmission, in which friction materials are adhered to only outer tooth plates or outer tooth plates and a flange.

2. Related Background Art

FIG. 2 is an axial sectional view of a conventional wet type multi-plate friction engaging apparatus 70. A drum 61 is secured to a transmission case (not shown), a retainer 59 is disposed on an inner periphery of the drum 61, and outer tooth plates 51 are incorporated in the retainer. Further, inner tooth plates 54 are attached to an outer peripheral surface of a hub 55 rotated in a direction shown by the arrow A and are interposed between the respective outer tooth plates 51. The outer tooth plates 51 and the inner tooth plates 54 are rotated relative to each other. A piston 52 is mounted near a closed end of the drum 61 and is operated by oil pressure supplied to an oil chamber defined between the piston and the side wall of the drum 61. A flange 64 is secured to an open end portion of the drum 61 by a snap ring 63. For friction engagement, the piston 52 is axially shifted to the right in FIG. 2 to urge the outer tooth plates 51.

In order to lubricate the frictional engagement surfaces between the outer tooth plates and the inner tooth plates from an axially central side, the hub 55 is provided with lubricating oil through holes 56 extending radially.

In this conventional wet type multi-plate friction engaging apparatus 70, friction materials 53 are usually secured to the inner tooth plates 54. Further, in another conventional case, friction materials are secured alternately to one side of the outer tooth plates and one side of the inner tooth plates or friction materials are secured to both the outer tooth plates and the inner tooth plates at different radial positions.

However, in the conventional wet type multi-plate friction engaging apparatuses, since the inner tooth plates are rotated at a high speed, lubricating oil included in the friction materials is removed due to high speed rotation, so that the friction materials cannot hold an adequate amount of oil. As a result, during the friction engagement, heat is apt to be generated, thereby causing thermal deformation called heat spot.

Further, in some wet type multi-plate friction engaging apparatuses used in motor bikes, although friction materials are secured to outer tooth plates, since lubricating oil is supplied in an oil bath manner, there arose a problem that squeezing torque in an idling condition is increased.

SUMMARY OF THE INVENTION

The present invention aims to eliminate the above-mentioned conventional drawbacks, and an object of the present invention is to provide a wet type multi-plate friction engaging apparatus in which less heat is generated during friction engagement and squeezing torque is minimized.

To achieve the above object, according to the present invention, there is provided a wet type multi-plate friction engaging apparatus in which axially shiftable outer tooth plates provided on an inner peripheral surface of a drum, and inner tooth plates disposed within the drum and spline-connected to an outer peripheral surface of a hub having lubricating oil supply holes open to the outer surface of the hub are arranged coaxially and alternately, so that the outer tooth plates and the inner tooth plates can be frictionally engaging with each other between a piston disposed at a closed end of the drum and a flange disposed at an open end of the drum by an urging force of the piston, and wherein the drum is not rotated or rotated at a low speed, and friction materials are adhered to only the outer tooth plates or the outer tooth plates and the flange.

Incidentally, in the specification, a term "low speed (rotation)" means a speed slower than 1000 rpm.

By adhering the friction materials to only the outer tooth plates and by supplying the oil from the hub side, i.e., central side, the supplying amount of the lubricating oil can be reduced, and even when the inner tooth plates are rotated at a high speed, the oil can be held in the friction materials.

DETAILED DESCRIPTION OF THE PREFERRED EMBODIMENT

Figure 1:
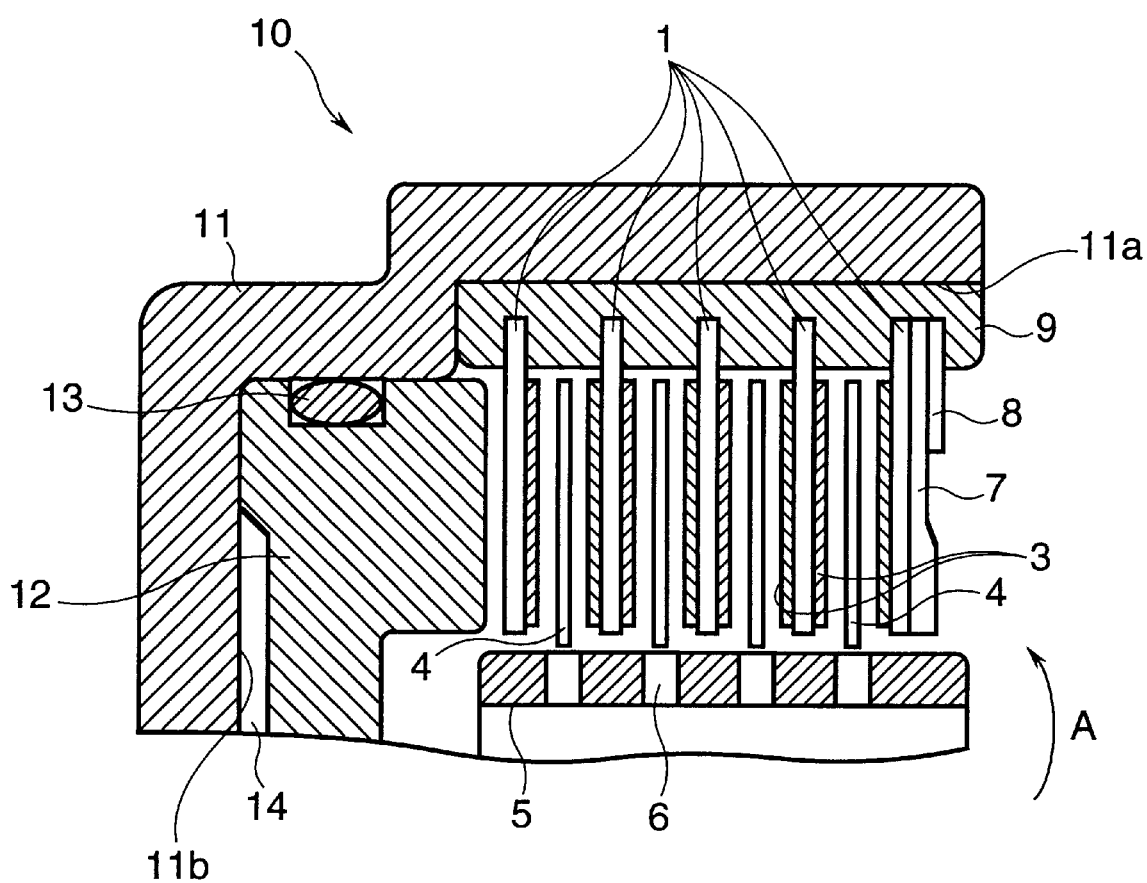
FIG. 1 is an axial sectional view of a wet type multi-plate friction engaging apparatus according to an embodiment of the present invention.
Figure 2:
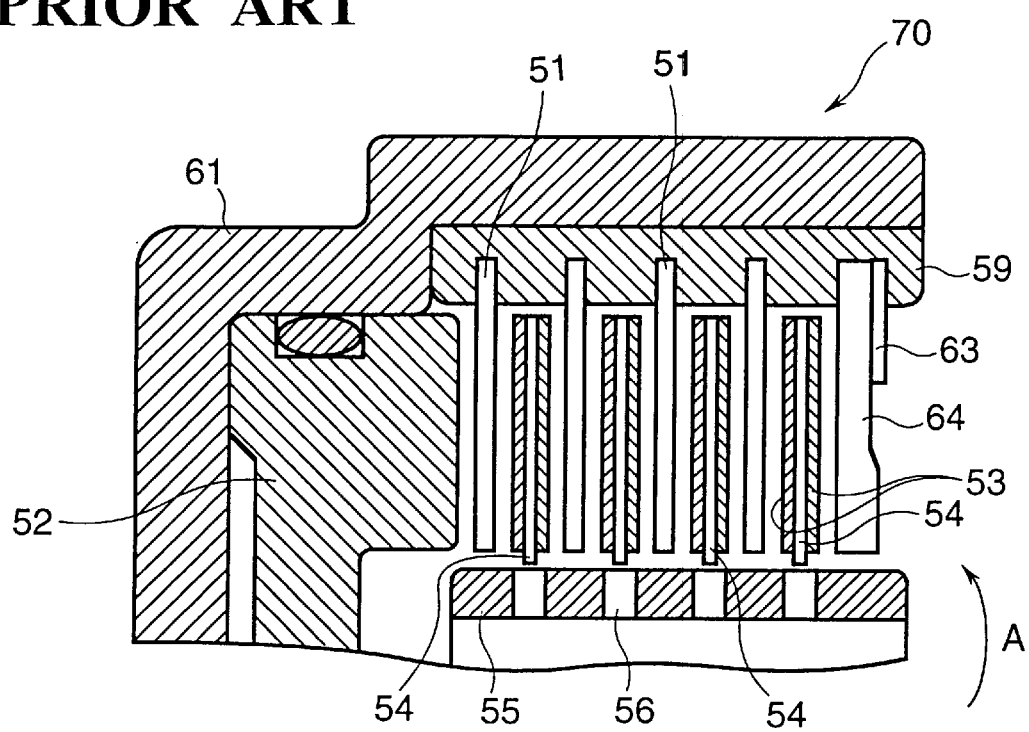
FIG. 2 is an axial sectional view of a conventional wet type multi-plate friction engaging apparatus.

The present invention will now be fully explained in connection with an embodiment thereof with reference to the accompanying drawings. Incidentally, in the drawings, the same elements are designated by the same reference numerals.

FIG. 1 is an axial sectional view of a wet type multi-plate friction engaging apparatus 10 according to an embodiment of the present invention. A drum 11 is secured to a transmission case (not shown) of an automatic transmission, a retainer 9 is disposed on an inner peripheral surface 11a of the drum 61 for axial sliding movement, and a plurality of outer tooth plates 1 are incorporated in the retainer substantially along an axial direction. Further, a plurality of inner tooth plates 4 are attached to an outer peripheral surface of a hub 5 rotated in a direction shown by the arrow A and are interposed between the respective outer tooth plates 1 substantially equidistantly along an axial direction. The outer tooth plates 1 and the inner tooth plates 4 are rotated relative to each other. A piston 12 is mounted near a closed end of the drum 1 and is operated by oil pressure supplied to an oil chamber 14 defined between the piston 12 and the side wall 11b of the drum 11. A flange 7 is secured to an open end portion of the drum 11 by a snap ring 8. For friction engagement, the piston 12 is axially shifted to the right in FIG. 1 to urge the outer tooth plates 1 into frictional engagement with the corresponding inner tooth plates 4. Each inner tooth plate 4 is attached to the hub 5 by combining splines 18 (FIG. 4) formed in an inner periphery of the inner tooth plate with corresponding splines (not shown) provided on the outer periphery of the hub.

In order to lubricate the frictional engagement surfaces between the outer tooth plates 1 and the inner tooth plates 4 from the axially central side, the hub 5 is provided with radially extending lubricating oil through holes 6 for supplying lubricating oil. Incidentally, an oil seal 13 for maintaining the oil chamber 14 in an oil-tight condition is disposed between the inner periphery of the drum 11 and the outer periphery of the piston 12.

Each of the non-rotating outer tooth plates 1 has the same construction as that of a conventional outer tooth plate (described later) shown in FIG. 3. The outer tooth plate is formed from a substantially annular member and is provided at its outer periphery with outwardly protruded pawls arranged equidistantly along a circumferential direction, which pawls can be fitted in the retainer 9 to secure the outer tooth plate to the retainer.

Friction materials 3 are adhered to the inner surface of the outermost (in an axial direction) outer tooth plates 1 and also are adhered to both surfaces of intermediate outer tooth plates 1. With this arrangement, friction engagement is achieved by pinching the respective inner tooth plates 4 between the corresponding outer tooth plates 1 from both sides in the axial direction.

Normally, since the thickness of a plate to which the friction materials are adhered is smaller than the thickness of a plate to which the friction material is not adhered, in dependence upon the inner and outer diameters and the thickness of the outer tooth plate and the dimensions and number of teeth of the outer tooth plate, the outer tooth plate can be made light-weight.

Incidentally, although the wet type multi-plate friction engagement apparatus 10 of the present invention is mainly used as a brake, even when it is used as a clutch, so long as the friction materials are not rotated, the same effect can be achieved.

In the above-mentioned embodiment, while an example that the drum 11 is not rotated was explained, even when the drum is rotated at a low speed (smaller than about 1000 rpm), substantially the same effect can be obtained. Further, in place of the outer tooth plate 1 contacted with the flange 7, a friction material 3 may be adhered to an inner surface of the flange 7.

Regarding the present invention in which the friction materials are adhered to the outer tooth plates and the lubricating oil is supplied from the axial center side and the conventional technique in which the friction materials are adhered to the inner tooth plates, presence/absence of heat spot was checked under tests in the following conditions:

| | |
|---|---|
| Number of revolutions | 8000 rpm |
| Surface pressure | 785 kPa |
| Inertia | 0.176 kg · m |
| Temperature of lubricating oil | 100° C. |
| Amount of lubricating oil | 0.18 l/min |
| Lubricating system | axial central oil supply |

Figure 3:
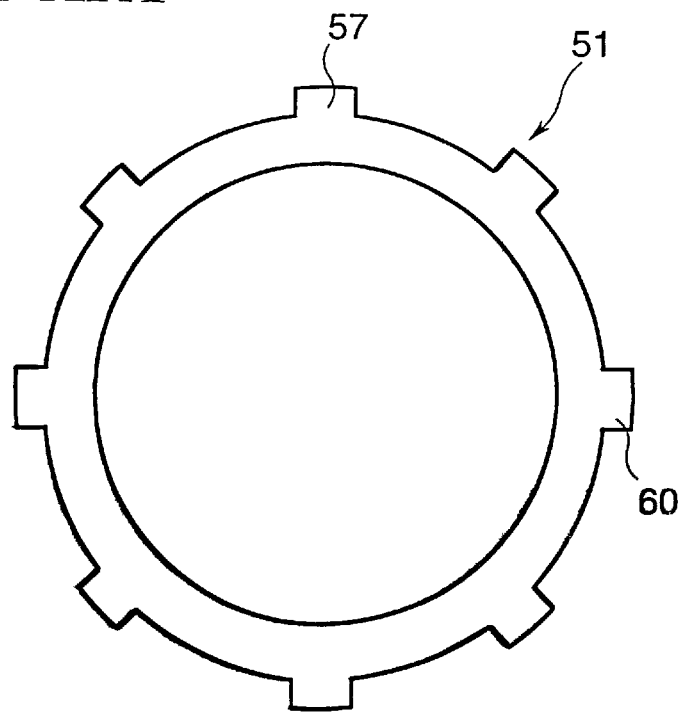
FIG. 3 is a front view of a conventional outer tooth plate after test.
Figure 4:
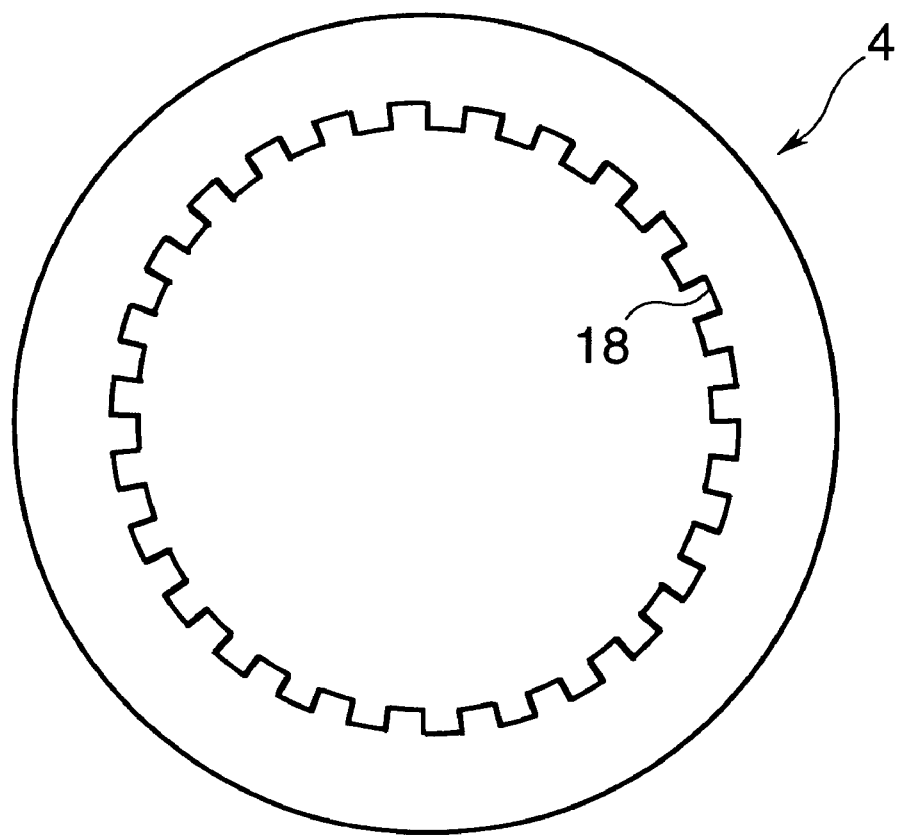
FIG. 4 is a front view of an inner tooth plate of the present invention after test.

Separator plates after the tests in the above conditions are shown in FIGS. 3 and 4. FIG. 3 shows a conventional separator plate, i.e., outer tooth plate 51 to which the friction material is not adhered. In this separator plate, it was found that heat spots 60 are generated near roots of pawls 57 provided on the outer periphery of the outer tooth plate 51 by the frictional engagement (frictionally sliding) between the outer tooth plate and the inner tooth plate to which the friction material is adhered.

On the other hand, FIG. 4 shows a separator plate used in the present invention, i.e., an inner tooth plate to which the friction material is not adhered. In this separator plate, as shown it was found that no heat spot is generated on the inner tooth plate 4.

According to the wet type multi-plate friction engaging apparatus as mentioned above, the following advantages can be obtained.

By adhering the friction material to the outer tooth plates and by supplying the lubricating oil from the center side, the amount of the lubricating oil can be reduced, and even when inner tooth plates are rotated at a high speed, since the oil can be held in the friction materials, squeezing torque in the idling operation can be reduced and less heat is generated.

What is claimed is:

1. A wet type multi-plate friction engaging apparatus operated as a brake, wherein:

axially shiftable outer tooth plates provided on an inner peripheral surface of a drum, and inner tooth plates disposed within said drum and spline-connected to an outer peripheral surface of a hub having lubricating oil supply holes open to the outer surface of said hub are arranged coaxially and alternately, so that said outer tooth plates and said inner tooth plates can be frictionally engaged with each other between a piston disposed at a closed end of said drum and a flange disposed at an open end of said drum by an urging force of said piston; and further wherein oil is supplied in a radially outward direction from said lubricating oil supply holes, said drum is not rotated or rotated at a low speed, and friction materials are adhered to only said outer tooth plates or said outer tooth plates and said flange.

2. An apparatus according to claim 1, wherein said drum is rotated at a low speed slower than about 1000 rpm.

* * * * *